United States Patent [19]

Yamashita

[11] Patent Number: 5,451,640
[45] Date of Patent: Sep. 19, 1995

[54] VULCANIZABLE, FLUORINE-CONTAINING ELASTOMER COMPOSITION

[75] Inventor: Eiichi Yamashita, Kitaibaraki, Japan

[73] Assignee: Nippon Mektron, Limited, Tokyo, Japan

[21] Appl. No.: 255,750

[22] Filed: Jun. 7, 1994

[30] Foreign Application Priority Data

Jun. 24, 1993 [JP] Japan .................. 5-177363

[51] Int. Cl.⁶ .............................. C08F 8/00
[52] U.S. Cl. ................... 525/245; 525/276; 525/326.3; 525/361
[58] Field of Search .............. 525/245, 276, 361

[56] References Cited

U.S. PATENT DOCUMENTS

| | | |
|---|---|---|
| 3,318,854 | 5/1967 | Yamashita . |
| 4,035,565 | 7/1977 | Apotheker et al. .................. 524/247 |
| 4,214,060 | 7/1980 | Apotheker et al. .................. 525/364 |
| 4,243,770 | 1/1981 | Tatemoto et al. .................. 525/331 |
| 5,334,667 | 8/1994 | Yamamoto et al. .................. 525/245 |

FOREIGN PATENT DOCUMENTS 2155375  5/1972  Germany .

OTHER PUBLICATIONS

Kauch Rezina, Vo. 5, p. 22, 1976.

*Primary Examiner*—Bernard Lipman
*Attorney, Agent, or Firm*—Lowe, Price, LeBlanc & Becker

[57] ABSTRACT

A vulcanizable, fluorine-containing elastomer composition, which comprises a fluorine-containing elastomer copolymerized with chlorotrifluoroethylene, (A) a salicylaldo-imino copper complex having the following chemical formula as a cross-linking agent:

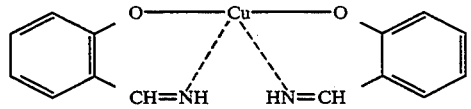

(B) at least one of a divalent metal oxide and hydroxide as an acid receptor, and (C) a polyfunctional unsaturated compound as a cross-linking agent have a high vulcanization rate and good physical properties in the normal state of vulcanization product.

7 Claims, No Drawings

VULCANIZABLE, FLUORINE-CONTAINING ELASTOMER COMPOSITION

BACKGROUND OF THE INVENTION

1. FIELD OF THE INVENTION

The present invention relates to a vulcanizable, fluorinecontaining elastomer composition, and more particularly to a vulcanizable composition of fluorine-containing elastomer copolymerized with chlorotrifluoroethylene.

2. DESCRIPTION OF THE PRIOR ART

In the vulcanization of fluorine-containing elastomers copolymerized with chlorotrifluoroethylene, for example, vinylidene fluoride-chlorotrifluoroethylene copolymer, it is reported to use an organic peroxide (U.S. Pat. No. 3,318,854), a polyamine-based derivative such as hexamethylenediamine carbamate (Offenlegungsschrift 2155375), or a triazine-2-thion-based compound (Kauch Rezina, Vol. 5, page 22, 1976) as its cross-linking agent.

However, these cross-linking agents still have problems to be solved, such as very low vulcanization rate and considerable difficulty to obtain vulcanized products by compression molding, and thus their actual practical applications have been much less up to the present.

SUMMARY OF THE INVENTION

An object of the present invention is to provide a vulcanization system of fluorine-containing elastomer copolymerized with chlorotrifluoroethylene, which is distinguished in the vulcanization rate and physical properties in the normal state of vulcanization product.

According to the present invention there is provided a vulcanizable, fluorine-containing elastomer composition, which comprises a fluorine-containing elastomer copolymerized with chlorotrifluoroethylene, (A) a salicylaldoimino copper complex having the following chemical formula as a cross-linking agent:

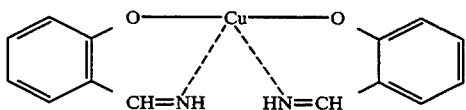

(B) at least one of a divalent metal oxide and hydroxide as an acid receptor, and (C) a polyfunctional unsaturated compound as a cross-linking agent.

DETAILED DESCRIPTION OF THE INVENTION

The fluorine-containing elastomer copolymerized with chlorotrifluoroethylene for use in the present invention includes coplymers prepared by copolymerizing 1 to 60% by mole, preferably 10 to 50% by mole, of chlorotrifluoroethylene and 99 to 40% by mole, preferably 90 to 50% by mole, of other fluorinated olefin. In case of copolymerization ratio with less than 1% by mole of chlorotrifluoroethylene, the vulcanization rate will be extremely low and shaped vulcanization products will be difficult to obtain, whereas in case of copolymerization ratio with more than 60% by mole of chlorotrifluoroethylene tensile strength, elongation, compression set, etc. of the vulcanization products will be lowered and no practical fluorine-containing elastomer can be obtained.

Other fluorinated olefins are preferably those having 2 to 8 carbon atoms, which include, for example, vinylidene fluoride, tetrafluoroethylene, hexafluoropropene, pentafluoropropene, lower alkyl perfluorovinyl ethers whose lower alkyl group is methyl, ethyl, n-propyl, isopropyl, n-butyl, isobuty or t-butyl, perfluoro(lower alkyl vinyl ethers) whose lower alkyl group is methyl, ethyl, n-propyl, isopropyl, n-butyl, isobutyl, t-butyl, n-amyl or isoamyl, perfluoro(propoxypropyl vinyl ether), etc. Besides these fluorinated olefins, vinyl floride, trifluoroethylene, perfluorocyclobutene, perfluoro (methylcyclopropene), hexafluoroisobutene, 1,2,2-trifluorostyrene, perfluorostyrene, etc. can be used.

These fluorinated olefins can be also used in such a form to copolymerize with an olefinic compound having 2 to 6 carbon atoms or a fluorinated diene having 4 to 8 carbon atoms. The olefinic compound includes, for example, olefins such as ethylene, propylene, butene, etc., unsaturated vinyl esters such as vinyl acetate, etc,, and lower alkyl vinyl ethers such as methyl vinyl ether, ethyl vinyl ether, etc. The fluorine-containing elastomer is copolymerized with usually 0.1 to 50% by mole, preferably about 0.5 to 30% by mole, of the olefinic compound.

The fluorinated diene includes, for example, perfluoro(1, 3-butadiene), perfluoro(1,4-pentadiene), perfluoro(1,7-octadiene), 1,1,2-trifluoro-1, 3-butadiene, 1,1,2-trifluoro-1,4-pentadiene, 1,1,2,3,3-pentafluoro-1,4-pentadiene, perfluoro -(divinyl ether), perfluoro(allyl vinyl ether), vinyl perfluoroallyl ether, etc. The fluorinated diene is preferably copolymerized with not more than 1% by mole into the fluorine-containing elastomer. Above 1% by mole, the resulting copolymer elastomer has a more pronounced tendency of gellation, resulting in a decrease in the processability (flow characteristics) or elongation of vulcanization products.

Typical examples of the fluorine-containing elastomers for use in the present invention include vinylidene fluoride-chlorotrifluoroethylene copolymer, vinylidene fluoride-hexafluoropropene-chlorotrifluoroethylene terpolymer, vinylidene fluoride-tetrafluoroethylene-chlorotrifluoroethylene terpolymer, vinylidene fluoride-tetrafluoroethylene-hexafluoropropene-chlorotrifluoroethylene quaternary copolymer, vinylidene fluoride-ethylene-chlorotrifluoroethylene terpolymer, vinylidene fluoride-propylene-chlorotrifluoroethylene terpolymer, etc. These fluorine-containing elastomers can be obtained by solution polymerization, suspension polymerization or emulsion polymerization according to the so far known procedure.

The salicylaldoimino copper complex (A) for use in the present invention as a cross-linking agent for these fluorine-containing elastomers is commercially available, and about 0.1 to about 20 parts by weight, preferably about 0.1 to about 10 parts by weight, of the complex is used per 100 parts by weight of the fluorine-containing elastomers.

At least one of the divalent metal oxide and hydroxide (B) for use in the present invention as an acid receptor includes oxides or hydroxides of such metals as magnesium, calcium, barium, lead, zinc, etc., and about 1 to about 40 parts by weight, preferably about 3 to about 25 parts by weight, of at least one of the oxide and the hydroxide is used per 100 parts by weight of the fluorine-containing elastomer. The polyfunctional unsaturated compound (C) for use in the present invention as a cocross-linking agent includes, for example, tri(metha)allyl isocyanurate, tri(metha)allyl cyanurate, tri(metha)allyl trimellitate, N,N'-m-phenylenebismaleimide, diallyl phthalate, tris(diallylamine)-s-triazine, triallyl phosphite, 1,2-polybutadiene, ethyleneglycol diacrylate, diethyleneglycol diacrylate, etc., and about 0.1 to about 20 parts by weight, preferably about 1 to about 10 parts by weight, of at least one of the polyfunctional unsaturated compound is used per 100 parts by weight of the fluorine-containing elastomer.

The composition can be prepared by mixing or kneading these components as such according to the ordinary mixing or kneading procedure, for example, by roll kneading, kneader mixing, Bambury kneading, etc., or can be used as a master batch dispersion for the fluorine-containing elastomer upon dilution and dispersion with carbon black, silica, clay, talc, diatomaceous earth, barium sulfate, or the like. The composition can further contain a plasticizer, a processing aid, a pigment, etc., when required, in any desired propotion, besides the above-mentioned components.

Vulcanization of the thus prepared composition is carried out usually according to primary vulcanization at a temperature of about 100 to about 250° C. for about 1 to about 120 minutes and a secondary vulcanization at a temperature of about 150 to about 250° C. for 0 to about 30 hours.

By using a salicylaldoimino copper complex as a crosslinking agent for a fluorine-containing elastomer copolymerized with chlorotrifluoroethylene together with a polyfunctional unsaturated compound as a cocross-linking agent, the vulcanization rate, which has been very low in case of the conventional organic peroxide or polyamine derivative cross-linking system, can be largely improved and also the difficulty so far encountered in the vulcanization molding by compression molding can be overcome. A shaped vulcanization product with good physical properties in the normal state can be obtained in the present invention.

PREFERRED EMBODIMENTS OF THE INVENTION

The present invention will be described in detail below, referring to Examples and Comparative Examples.

Examples 1 and 2

Vinylidene fluoride and chlorotrifluoroethylene were subjected to copolymerization in an aqueous medium in the presence of ammonium persulfate as a polymerization initiator and isopropyl alcohol as a chain transfer agent to obtain a copolymer [fluorine-containing elastomer A; molar ratio of vinylidene fluoride to chlorotrifluoroethylene of 58:42; solution viscosity $\eta sp/c=0.65$ (35° C., c=1.0 in methylethylketone), polymer Mooney viscosity $ML_{1+10}=40$ (121° C.)].

|  | Parts by weight |
|---|---|
| Fluorine-containing elastomer A: | 100 |
| MT carbon black | 15 |
| Calciun hydroxide | 10 |
| Magnesium oxide | 7 |
| Zinc oxide | 4 |
| Salicylaldoimino copper complex | 3 |
| Triallyl isocyanurate for Example 1 | 3 |
| for Example 2 | 5 |

The foregoing components were kneaded together in a 8-inch mixing roll to obtain fluorine-containing elastomer compositions. Vulcanization characteristics of the thus prepared compositions were determined by an oscillating disc rheometer (ODR) of Toyo Seiki K.K., Japan. The compositions were subjected to press vulcanization (primary vulcanization) at 180° C. for 10 minutes and an oven vulcanization (secondary vulcanization) at 200° C. for 22 hours, and the physical properties of the resulting vulcanization products in the normal state were determined according to JIS K-6301. Separately, O-rings (P-24) were prepared from the same compositions by vulcanization molding under the same vulcanization conditions and then subjected to determination of compression set upon 25% compression.

Examples 3 and 4

In Examples 1 and 2, the same amount of lead oxide was used in place of zinc oxide while other conditions were kept the same.

Comparative Example 1

|  | Parts by weight |
|---|---|
| Fluorine-containing elastomer A: | 100 |
| MT carbon black | 15 |
| Magnesium oxide | 10 |
| Lead oxide | 5 |
| Hexamethylenediamine carbamate | 2.5 |

A fluorine-containing elastomer composition was prepared from the foregoing components in the same manner as in Examples 1 and 2, and determination of vulcanization characteristics and physical properties in the normal state and compression set of the vulcanization products was carried out also in the same manner as in Examples 1 and 2.

Comparative Example 2

In Example 2, 2 parts by weight of 2,5-dimethyl-2,5-di(t-butylperoxy)hexane was used in place of 3 parts by weight of salicylaldoimino copper complex.

Results off determination in Examples 1 to 4 and Comparative Examples 1 and 2 are shown in Table 1. In Comparative Examples 1 and 2 molding was impossible to carry out and neither physical properties in the normal state nor compression set were determined.

TABLE 1

| Determinations | Example 1 | Example 2 | Example 3 | Example 4 | Comp. Ex. 1 | Comp. Ex. 2 |
|---|---|---|---|---|---|---|
| [Vulcanization characteristics] | | | | | | |
| Minimum torque (kg · cm) | 14 | 13 | 13 | 13 | 21 | 12 |
| Torque at 2 minutes (kg · cm) | 64 | 69 | 61 | 65 | 31 | 14 |
| Torque at 5 minutes (kg · cm) | 78 | 84 | 74 | 78 | 35 | 14 |
| Torque at 10 minutes (kg · cm) | 80 | 84 | 76 | 80 | 38 | 14 |
| Time till minimum torque +5.0 kg · cm (min.) | 1.1 | 1.1 | 1.2 | 1.2 | 0.7 | — |
| [Physical properties in the normal state] | | | | | | |
| Hardness (JIS-A) | 78 | 78 | 77 | 78 | | |
| 100% Modulus (kgf/cm$^2$) | 123 | 127 | 115 | 120 | | |
| Tensile strength (kgf/cm$^2$) | 185 | 205 | 178 | 197 | | |
| Elongation (%) | 201 | 195 | 223 | 207 | | |
| [Compression set] | | | | | | |
| 200° C. for 70 hours (%) | 48 | 42 | 52 | 47 | | |

Examples 5 and 6

Vinylidene fluoride -hexafluoropropene -chlorotrifluoroethylene terpolymer [fluorine-containing elastomer B; molar ratio of vinylidene fluoride: fluoropropene: chlorotrifluoroethylene of 55:8:37; solution viscosity $\eta sp/c = 0.60$ (35° C., c=1.0 in methylethylketone), Mooney viscosity $ML_{1+10}=30$ (121° C.)] was used as a fluorine-containing elastomer.

|  | Parts by weight |
| --- | --- |
| Fluorine-containing elastomer B: | 100 |
| MT carbon black | 15 |
| Calcium hydroxide | 10 |
| Magnesium oxide | 7 |
| Zinc oxide for Example 5 | 4 |
| Lead oxide for Example 6 | 4 |
| Salicylaldoimino copper complex | 3 |
| Triallyl isocyanurate | 4 |

Fluorine-containing elastomer compositions were prepared from the foregoing components in the same manner as in Examples 1 and 2, and determination of vulcanization characteristics of the compositions and physical properties in the normal state and compression set of the vulcanization products was carried out also in the same manner as in Examples 1 and 2.

Comparative Example 3

|  | Parts by weight |
| --- | --- |
| Fluorine-containing elastomer B: | 100 |
| MT carbon black | 15 |
| Magnesium oxide | 10 |
| Hexamethylenediamine carbamate | 2.5 |
| Lead dibasic phosphite | 10 |

A fluorine-containing elastomer composition was prepared from the foregoing components in the same manner as in Examples 1 and 2, and determination of vulcanization characteristics of the compositions and physical properties in the normal state and compression set of the vulcanization products was carried out also in the same manner as in Examples 1 and 2.

Results of determination in Examples 5 and 6 and Comparative Example 3 are shown in Table 2.

TABLE 2

| Determinations | Ex. 5 | Ex. 6 | Comp. Ex. 3 |
| --- | --- | --- | --- |
| [Vulcanization characteristics] | | | |
| Minimum torque (kg · cm) | 10 | 9 | 9 |
| Torque at 2 minutes (kg · cm) | 53 | 50 | 24 |
| Torque at 5 minutes (kg · cm) | 65 | 61 | 44 |
| Torque at 10 minutes (kg · cm) | 68 | 65 | 54 |
| Time till minimum torque +5.0 kg · cm (min.) | 1.3 | 1.3 | 1.1 |
| [Physical properties in the normal state] | | | |
| Hardness (JIS-A) | 75 | 75 | 71 |
| 100% Modulus (kgf/cm$^2$) | 98 | 92 | 28 |
| Tensile strength (kgf/cm$^2$) | 172 | 158 | 85 |
| Elongation (%) | 243 | 255 | 327 |
| [Compression set] | | | |
| 200° C. for 70 hours (%) | 53 | 55 | 85 |

What is claimed is:

1. A vulcanizable, fluorine-containing elastomer composition, which comprises a fluorine-containing elastomer copolymerized with chlorotrifluoroethylene, (A) a salicylaldoimino copper complex having the following chemical formula as a cross-linking agent:

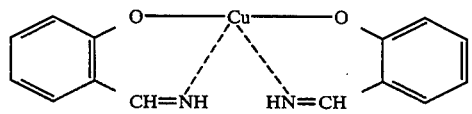

(B) at least one of a divalent metal oxide and hydroxide as an acid receptor and (C) a polyfunctional unsaturated compound as a cross-linking agent wherein the composition cures through the presence of the chlorotrifluoroethylene in the polymer.

2. A vulcanizable, fluorine-containing elastomer composition according to claim 1, wherein the fluorine-containing elastomer comprises 1 to 60% by mole of the chlorotrifluoroethylene and 99 to 40% by mole of other fluorinated olefin.

3. A vulcanizable, fluorine-containing elastomer composition according to claim 1, wherein the fluorine-containing elastomer is a copolymer of chlorotrifluoroethylene and other fluorinated olefin, further copolymerized with a fluorinated diene having 4 to 8 carbon atoms.

4. A vulcanizable, fluorine-containing elastomer composition according to claim 1, wherein the fluorine-containing elastomer is a copolymer of chlorotrifluoroethylene and other fluorinated olefin, further copolymerized with an olefinic compound having 2 to 6 carbon atoms and a fluorinated diene having 4 to 8 carbon atoms.

5. A vulcanizable, fluorine-containing elastomer composition according to claim 1, wherein about 0.1 to about 20 parts by weight of the cross-linking agent (A) is contained per 100 parts by weight of the fluorine-containing elastomer.

6. A vulcanizable, fluorine-containing elastomer composition according to claim 1, wherein about 1 to about 40 parts by weight of the acid receptor (B) is contained per 100 parts by weight of the fluorine-containing elastomer.

7. A vulcanizable, fluorine-containing elastomer composition according to claim 1, wherein about 0.1 to about 20 parts by weight of the cross-linking agent (C) is contained per 100 parts by weight of the fluorine-containing elastomer.

* * * * *